SYNCHRONIZED, MAXIMUM EFFECTIVE FREQUENCY, WAVE CONVERSION SYSTEM EMPLOYING TIME DELAY PULSE GENERATING AND SYNCHRONIZING MEANS, AND COMPONENT OF SYSTEM

Filed Feb. 15, 1965 4 Sheets-Sheet 1

INVENTORS
William I.L. Wu
Leo A. Giangarra

WITNESS
William Martin Jr.

BY Marshall J. Breen
ATTORNEY

INVENTORS
William I. L. Wu
Leo A. Giangarra
BY Marshall J. Breen
ATTORNEY $f_{out}=\frac{f_{in}}{1+2n}$ n=0,1,2,3⋯ ∞

INVENTORS
William I. L. Wu
Leo A. Giangarra

WITNESS
William Martin Jr.

BY Marshall J. Breen
ATTORNEY

SYNCHRONIZED, MAXIMUM EFFECTIVE FREQUENCY, WAVE CONVERSION SYSTEM EMPLOYING TIME DELAY PULSE GENERATING AND SYNCHRONIZING MEANS, AND COMPONENT OF SYSTEM

Filed Feb. 15, 1965 4 Sheets-Sheet 4

WITNESS
William Martin Jr.

INVENTORS
William I. L. Wu
Leo A. Giangarra
BY Marshall J. Breen
ATTORNEY

United States Patent Office 3,398,372

Patented Aug. 20, 1968

3,398,372

SYNCHRONIZED, MAXIMUM EFFECTIVE FREQUENCY, WAVE CONVERSION SYSTEM EMPLOYING TIME DELAY PULSE GENERATING AND SYNCHRONIZING MEANS, AND COMPONENT OF SYSTEM

William I. L. Wu, Westport, Conn., and Leo A. Giangarra, Orange, Calif., assignors to The Singer Company, New York, N.Y., a corporation of New Jersey Filed Feb. 15, 1965, Ser. No. 432,580
2 Claims. (Cl. 328—28)

ABSTRACT OF THE DISCLOSURE

A polarity switch comprising a pair of cathode connected silicon controlled rectifiers each connected in parallel with one of a pair of anode connected diodes is controlled by an adaptive wave (frequency) converter comprising a wave conversion system. The wave conversion system may be connected either across the switch or across the source of power to the polarity switch and a load. The converter input is connected to a pulse generator. A synchronized multivibrator is controlled by pulses sharpened by the pulse generator and by a timing circuit to provide pulses at a sub-multiple of the pulse frequency from the pulse generator, which is below a frequency determined by the timing circuit. The timing circuit includes a delay circuit responsive to pulses from one output of the synchronized multivibrator to generate a ramp voltage in unijunction transistor circuit which, after a predetermined time delay, actuates a transistor pulse generator. Then the latter pulse operates the synchronized multivibrator to its reset state. The next pulse from the first pulse generator operates the synchronized multivibrator to initiate a timing period and to operate the bistable multivibrator which controls a push-pull switching circuit to provide reversed polarity outputs to the control electrodes of the controlled rectifiers in the polarity switch.

This invention relates to static conversion of high frequency alternating current to lower effective frequency alternating current for supply to a load operable at such lower frequency, and more particularly to direct conversion from one alternating current frequency to a lower effective alternating current frequency without employing an intermediate stage of rectification to direct current. This invention also relates to phase synchronized wave conversion. Further, this invention relates to relaxation timing circuits for providing an output pulse a predetermined time subsequent to provision of a steady state input thereto. In another aspect, this invention relates to synchronized wave converters or signal generators for providing from a signal generator an output signal of a lower frequency than the input signal and synchronized with the input signal.

In still another aspect, this invention relates to static apparatus for providing an alternating current power output having a fundamental frequency less than a selected value regardless of the frequency of energy supplied to the apparatus from an alternating current power source.

This invention also relates to providing an output signal from apparatus connected to a variable frequency source, the frequency of which output signal is an integral, odd submultiple of the input signal frequency of the variable frequency source.

In the art of combined wave and effective frequency reduction conversion of alternating current power from a high frequency to a low effective frequency reduction, systems previously suggested have employed rectification, and subsequent switching by switching circuits operated by an independent source operating at the lower frequency desired. Alternatively, circuits employing numerous transformers, bulky phase shifting devices and independent power sources operating at the desired frequency have been suggested for operating controlled rectifiers. The disadvantages of these systems are numerous.

Rectification leads to attendant power loss in the rectifiers as well as radio-frequency interference. It is costly and inconvenient to require an independent frequency source operating at the desired frequency. Bulkiness, weight and single frequency operation of such devices are further disadvantages that they have. The advantages of these systems are that they are less bulky and expensive than a motor generator set and do not involve brush noise.

Another disadvantage of prior art systems resides in the fact that the harmonic level of output power produced was high because of lack of synchronization of the switching time with the high frequency sine wave. Such lack of synchronization will lead to switching of segments of sine waves of such duration as to generate large amplitude signals at frequencies higher than the fundamental frequency, which will create large amounts of random noise or radio frequency interference. The above will not contribute to the torque of, say a sixty cycle motor; but will increase motor losses, mechanical noise and vibration of the motors, and, in other words, decrease the efficiency of power transfer.

It is desirable that a frequency conversion system provide direct conversion of energy from a high frequency power supply to a lower frequency to be supplied to a conventional load without employing an intermediate stage of rectification to direct current; thereby realizing a higher efficiency of energy transfer and minimizing random noise and radio frequency interference. Also it is desirable that an effective frequency and wave conversion system should provide at least the same percentage frequency regulation as the power supply.

It is desirable to connect the power supply through a series connected polarity reversing switch to a conventional single phase load without employing a transformer. We have found that high efficiencies of energy transfer can be obtained by direct AC to DC conversion and use of energy storage elements connected across the load.

We also have found that it is possible to provide higher average power to the load with use of a properly selected storage element connected across the load when employing this invention.

It is also desirable that such a system have no moving parts, be capable of supplying several different types and sizes of loads, simultaneously, consume little power for operation of the control circuitry and consume little power when no load is placed upon the system. In addition, the circuit should require no direct current source other than that required for bias of electronic components of the control system. Further the cost of the control system should be low.

Little skill and time should be required to install the system. The system should be designed to prevent damage to it if the load should be disconnected or damage to the load in the event of failure of the system. A primary requirement of such a system in certain applications is that it be adapted to provide a stable output frequency within a predetermined frequency range, regardless of the frequency range of the available power supply. For instance, in the case of a portable system with a sixty cycle motor load to be driven by 60, 400 or 1000 c.p.s. power sources, the control system should be capable of automatically providing an effective output frequency in the range of 60 c.p.s. without requiring readjustment.

A further advantage of such a system arises in generation of power in locations where it is not possible to derive power from a central plant. For example, isolated facilities or homes in areas of low population density may not be serviced by a power company. In such cases, as 60 cycle power has been required to drive motors for appliances, etc., the small power generation units employed have been designed to deliver 60 cycle power. Gasoline engine generator systems are ideal for this

*Adaptive frequency converter*

The basic structure of the adaptive frequency converter 30 is shown in block diagram form in FIG. 3. The signals purpose. A gasoline engine provides a sufficiently low shaft speed for the generator to supply this frequency of power output without intermediate gearing. However, gasoline driven engines have short life, require frequent maintenance and overhaul, are noisy, vibrate, and present problems of speed regulation. Gasoline and steam turbine systems operate at such high speeds, relative to the shaft speed desired for 60 cycle generators, that costly gears of relatively low efficiency have been necessary.

With adaptive wave conversion and frequency control, it is obvious that a turbine may be directly coupled to a high frequency generator without gearing. At the higher frequency, less magnetic material and copper will be required per unit output in the generator. Hence, the system will be more efficient, less costly, lighter and more portable. In addition, units such as electroluminescent and fluorescent lamps which may be driven by say 400 cycle power could be operated by an adaptive wave conversion and frequency control unit providing 400 cycle power, whereas other adaptive wave conversion and frequency control units may be employed to provide power at 60 cycles or any other desired frequency.

As the adaptive wave conversion and frequency control units presently employed weigh less than 2 pounds, they may be made lighter and very small, especially if integrated circuitry is employed, and the cost of the manufactured units is low. Such multiple frequency systems are ideally suitable for such applications.

In the art of wave and frequency conversion or signal generation it is desirable that a system be capable of providing a signal which is a submultiple of the input frequency supplied thereto, which is synchronized with the point of phase reversal of the input signal, and which has a maximum frequency limited by a predetermined adjustable value.

In the art of timing, it is desirable that improved circuitry for providing a pulse after a predetermined time delay be provided. Such circuitry should be synchronously responsive to a steady-state signal introduced thereto.

In addition, it is desired to provide improved monostable pulse circuits providing a precisely controllable time delay between actuation of such circuits to their unstable condition and return to their stable condition.

It is also desired to provide a novel switch for controlling polarity of conduction in a circuit by reversibly permitting conduction in a single direction at a given time.

In one aspect, this invention comprises a system for direct conversion from alternating current of a first frequency to alternating current of a lower frequency without employing a stage of rectification. Rather, the load, a polarity reversing switch and a power source are connected in series. The polarity switch is controlled by control circuitry which is adaptive to changes in input frequency to provide control signals for reversing the polarity switch within predetermined ranges of frequencies. The reversal of control signals is in substantial synchronism with reversal of polarity of the potential across the load and the power source.

Other aspects of this invention are described below in connection with reference to the appended drawings in which.

Figure 1:
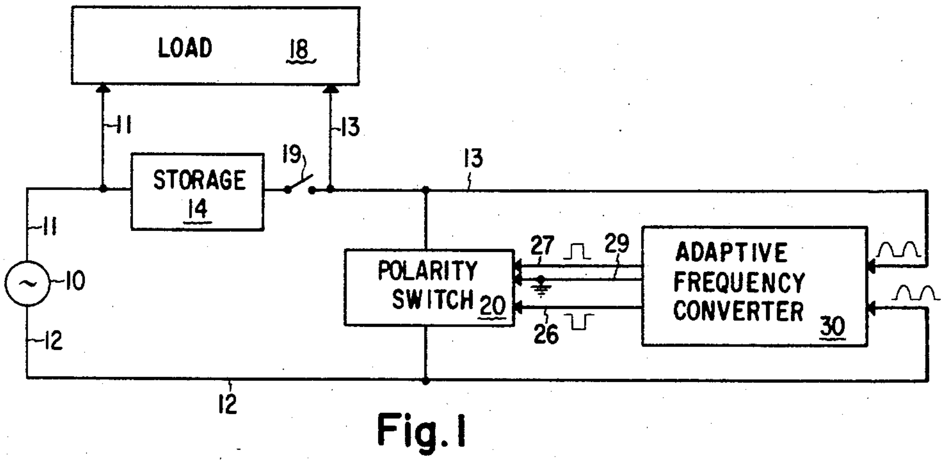
FIG. 1 is a schematic block diagram of an alternating current to alternating current wave and effective frequency conversion system in accordance with this invention.

Referring to FIG. 1, in the direct AC to AC wave and effective frequency conversion system shown, a source 10 of alternating current (of say 400 c.p.s. or 1000 c.p.s. to be converted to an output frequency in the order of say 60 c.p.s.) is employed to supply power to a load 18. The load 18 may be a conventional motor designed to operate at an effective frequency of about 60 c.p.s. A pair of bus lines 11 and 12 connect the source 10 to the system. The bus line 11 is connected to one end of the load 18 and a first side of storage element 14. Bus line 12 is connected through the power terminals of a polarity switch 20 to bus line 13. Bus line 13 may be connected to the other side of the storage element 14 by switch 19 and is connected to the other side of the load 18. Polarity switch 20 has two power terminals connected to lines 12 and 13. Switch 20 permits alternate unidirectional conduction of current which is reversible by reversal of the polarity of the input signals supplied to a pair of control lines 26 and 27 of the polarity switch 20 with respect to a ground line 29. Hence, a series of, say positive, half-wave pulses will pass through switch 20 from bus line 12 to bus line 13 for a relatively positive potential on line 26 and a relatively negative potential on line 27. As shown, control line 27 has a positive potential and control line 26 has a negative potential, so that pulses will travel from bus line 13 to bus line 12. If the potential upon both lines 26 and 27 were positive with respect to ground line 29, then current would travel in both directions through polarity switch 20 between bus lines 12 and 13. Hence by alternate reversal of potential upon the control lines 26 and 27 at a frequency which is an integral submultiple of the frequency of source 10, and in synchronism with reversal of phase thereof, an effective alternating current at that lower frequency can be obtained. It will be noted that direct AC to AC power conversion has been described above without employing a stage of rectification. Such lower frequency will comprise a number of halves of sine waves of one polarity followed by an equal number of halves of sine waves of the opposite polarity; assuming that source 10 provides a sine wave signal, and that load 18 and storage means 14 do not distort the waveform. While such an output at the lower "effective" output frequency comprises pulses formed from halves of sine waves reversed in polarity at the lower frequency, throughout this specification, it should be understood that the term "lower frequency" will refer to the fact that such an effective non-sinusoidal lower frequency is produced by the system. The phrase "adaptive frequency converter" is intended to refer to a type of converter which converts the wave shape as well as its rate of repetition, i.e., frequency, in synchronism with the leading edge of a half sine wave.

Figure 5:
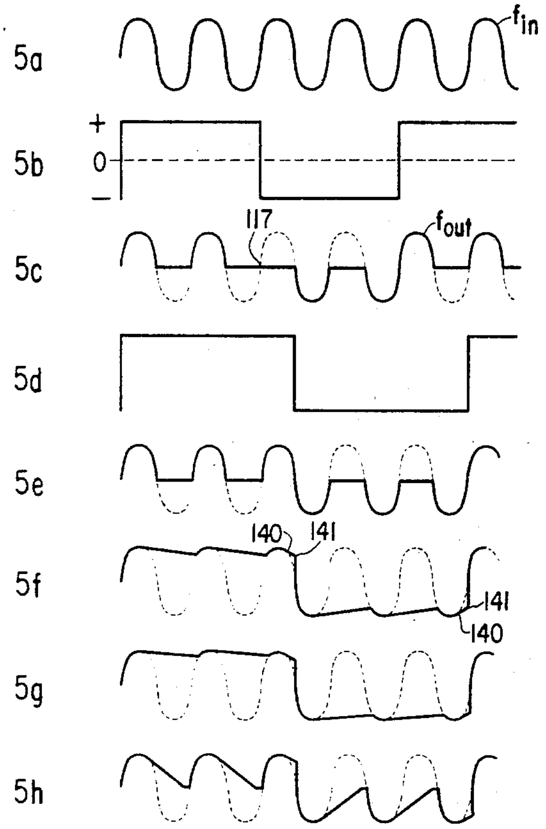
FIG. 5 shows voltage waveforms employable in the systems shown in FIGS. 1 and 2.
Figure 8:
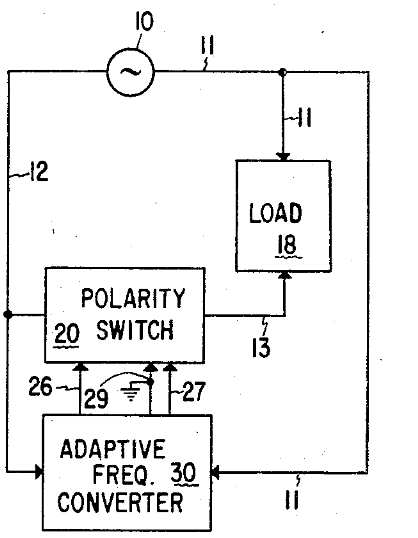
FIG. 8 is a schematic block diagram of a system in accordance with this invention similar to the system of FIG. 1.

Referring to FIG. 5*a*, a sine wave is shown representing the voltage of source 10 (vertical axis) as a function of time (horizontal axis). FIG. 5*b* shows a square wave representing polarity of the polarity switch when operating at a frequency of one-fourth that of the sine wave and phase synchronized therewith. FIG. 5*c* shows in solid lines the output signal obtained on the load which includes the two positive half-waves of the source voltage, during the time that the square wave is positive and two negative half-waves of the source voltage, during the time that the square wave is negative. It will be noted that the solid waveform is not symmetrical. The dotted lines indicate the portion of the source voltage which is blocked by polarity switch 20. This method of operation is further described below under "obtaining odd submultiples of input frequency," with reference to FIG. 8.

However, when dividing the input frequency by an odd integer, i.e., $1+2n$, where $n$ is a positive integer, a symmetrical wave is obtained as shown in FIG. 5*e*. A square wave, shown in FIG. 5*d*, of a lower frequency than that of FIG. 5*b* is employed in order to provide the desired output frequency comprising three positive pulses followed by three negative pulses in a symmetrical configuration, more nearly approximating a sine wave, and accordingly containing relatively less distortion attributable to harmonic frequencies, as we have determined by analysis with a spectrum analyzer.

By introducing electrical energy storage means 14 into the circuit (switch 19 closed) a waveform such as that shown in FIG. 5*f* may be obtained for the conditions described with respect to FIG. 5*e*. As is shown in FIG. 5*f*, the waveform has been changed reflecting the effect of the storage element 14, which causes the solid-line wave to approximate the shape of a sine wave to a greater degree. During the positive half-waves of the input voltage from the power supply, energy is supplied to the storage element 14 and the load 18. During the negative half cycle of the input voltage, no power is delivered from the line to the load, but some of the stored energy in the storage element is now delivered to the load. FIG. 5*g* illustrates the effect upon the waveform of FIG. 5*e* of employing a large capacitance as the storage element 14 and FIG. 5*h* illustrates the effect of substitution of a small capacitance therefor. FIG. 5*f* shows the effect of the preferred value of capacitance which will permit discharge of the capacitor within one-quarter wave length at the fundamental frequency to be delivered to the load 18, when source 10 is also operating at that frequency, e.g., 60 c.p.s.

Figure 2:
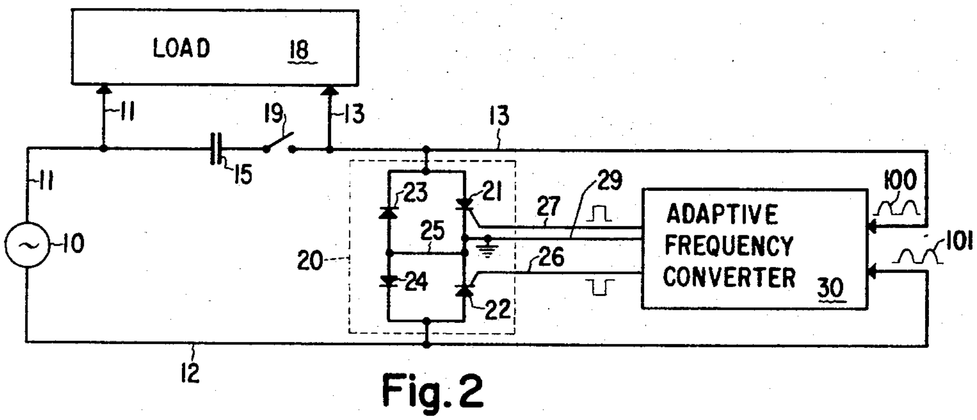
FIG. 2 is a specific form of the system shown in FIG. 1.

Switching waveforms such as those shown in FIG. 5*d* may be obtained by employing an adaptive frequency converter 30 having its input terminals connected to bus lines 12 and 13 as in FIGS. 1 and 2. The potential across lines 12 and 13 may correspond to that shown by the dotted lines with reference to the solid lines in FIGS. 5*c* and 5*e* when no storage is used. This is so, because the nonconducted pulses, i.e., those not passing through the polarity switch 20, will appear across it, whereas those which are conducted will not. The first pulses will effect initiation of operation of a timing circuit in converter 30 which will set the polarity of the polarity switch 20 through lines 26, 27 and 29. It will reverse the polarity of the polarity switch 20 in synchronism with the next such nonconducted pulse to occur after the predetermined time determined by the timing circuit. In this way, reversal of polarity will occur at or near the desired output frequency, and substantially in synchronism with the pulses of the input frequency from source 10.

Figure 3:
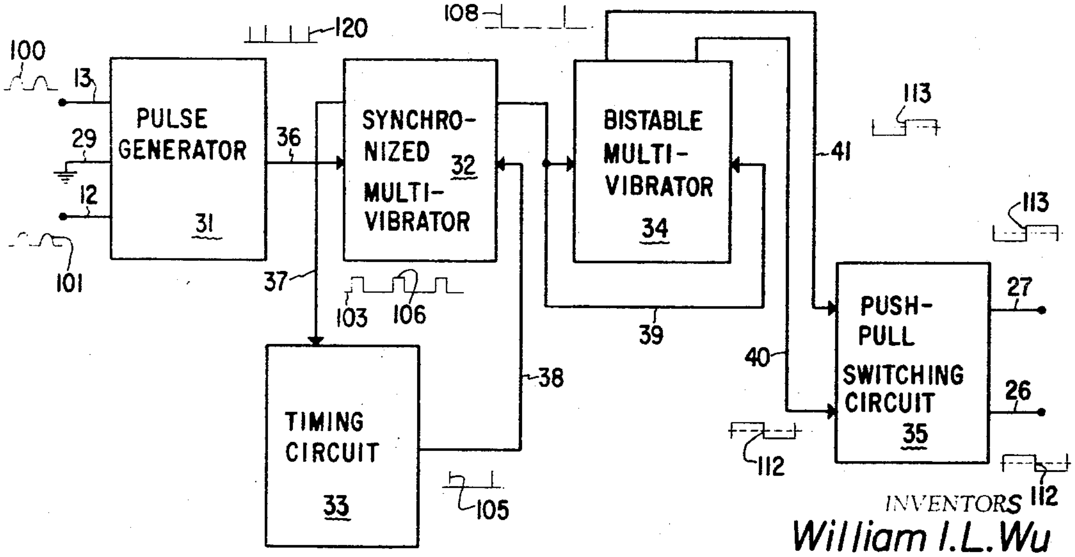
FIG. 3 is a schematic block diagram of the adaptive wave converting frequency control system shown in FIGS. 1 and 2.

Note in FIGS. 5*f*, 5*g* and 5*h* that the dotted lines with reference to the solid lines indicate the potential across the polarity switch 20. Pulses of such potential commence earlier than those in FIG. 5*e*, because the capacitance of the storage element 14 retains a potential near the peak potential from the generator 10, after the generator potential has declined, generally in accordance with the shape of the dotted line. Hence, the voltage wave across the polarity switch 20 commences almost one-quarter wavelength, at the generator frequency, earlier in FIG. 5*g* than it does in FIG. 5*e*. As a result the adaptive frequency converter 30 is actuated earlier, and the polarity switch 20 may reverse before the voltage across the generator 10 passes through zero. Referring to FIG. 5*f*, at points 140, potential begins to appear across the polarity switch 20 and is supplied to the adaptive frequency converter 30. The polarity switch reverses at points 141, after the adaptive frequency converter 30 and the polarity switch 20 have had time to operate. Hence, there is a sharp discontinuity in the rate of change of potential at points 141 as the capacitor is discharged rapidly through the polarity switch 20 upon reversal thereof. These concepts will be explained in greater detail below with reference to FIGS. 3 and 6.

Referring to FIG. 2, a practical form of the polarity switch 20 is illustrated and a capacitor 15 is substituted for the storage means 14. In this embodiment of the invention, the cathodes of a pair of controlled rectifiers 21, 22 are connected together and the anodes are respectively connected to bus lines 13 and 12.

The anodes of a pair of diodes 23, 24 are connected together, to the cathodes of the controlled rectifiers 21, 22 and to the reference potential of the adaptive frequency converter 30 by line 29. The cathodes of diodes 23, 24 are respectively connected to bus lines 13 and 12.

When a positive potential with respect to reference potential (line 29) appears upon the control electrode of controlled rectifier 21 from line 27 as illustrated in FIGS. 1 and 2, that rectifier 21 will conduct. Hence, a positive potential from source 10 on bus line 11 with respect to bus line 12 will cause conduction through load 18, bus line 13 controlled rectifier 21, diode 24 and bus line 12 back to source 10. In contrast, if the potential on line 26 is negative with respect to the potential on line 29, a positive potential on line 12 with respect to line 13 will appear across lines 12 and 13. The polarity switch will not conduct because controlled rectifier 22 will appear to be an open circuit. Slight conduction will occur from bus line 12 through the converter 30 to line 29 through diode 23 to ground. Diode 24 will not conduct substantially in the reverse direction.

When a negative bias is placed on the control electrode of rectifier 21 and a positive bias is placed on the control electrode of rectifier 22, then positive potential on line 12 will cause conduction through controlled rectifier 22, diode 23, line 13 and load 18 to line 11. Positive potential impressed by source 10 on line 11 with respect to line 12 will appear with substantially no impedance drop on line 13, because diode 23, and rectifier 21 will not conduct, although diode 24 will conduct small current from the converter and line 29 through point 25, so that line 12 will be clamped at or near reference potential on line 29 and line 13 will impress a positive potential on the other input of converter 30 equal to source potential.

Figure 6:
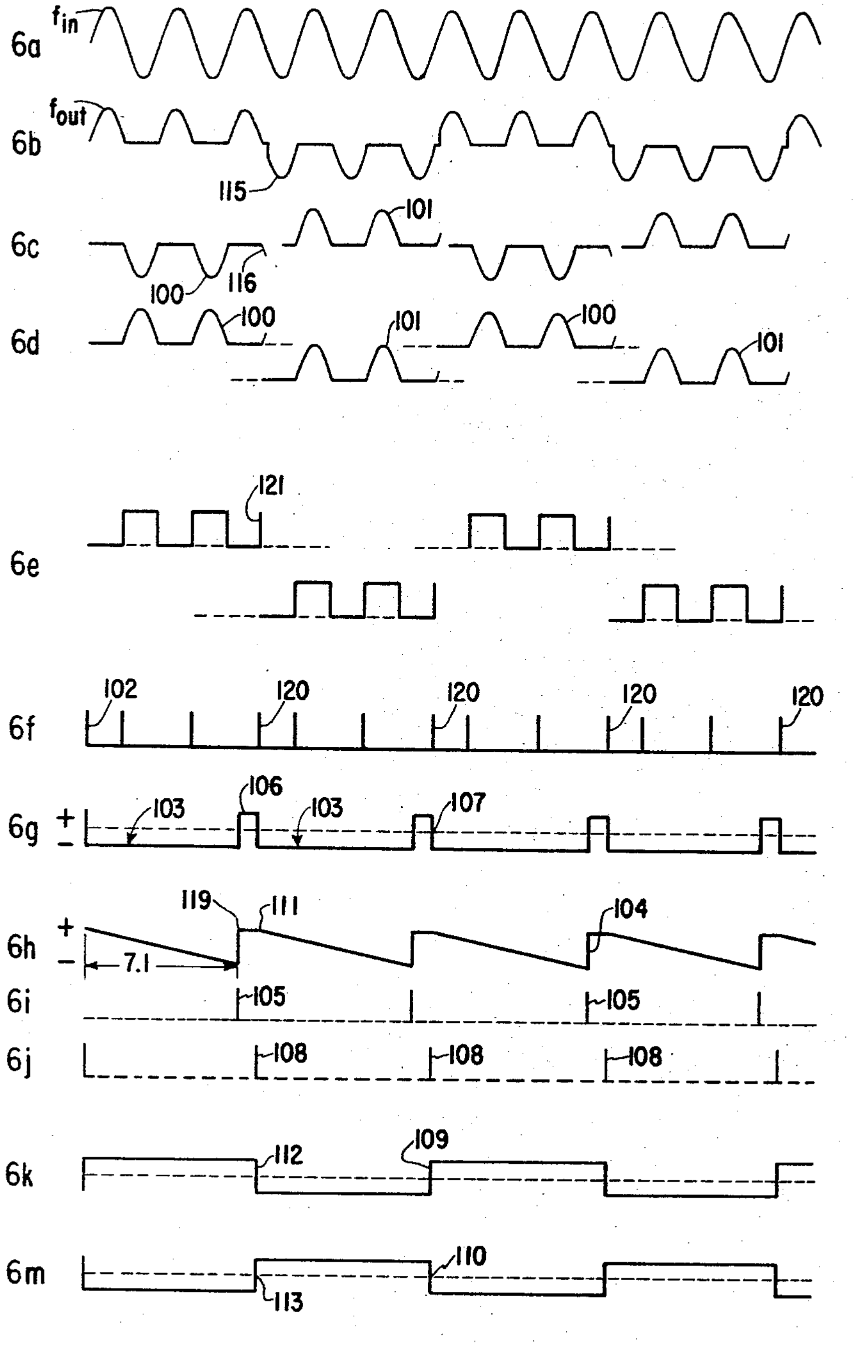
FIG. 6 shows waveforms related to operation of the systems and circuits shown in FIGS. 1–4 without use of a storage element.

Hence it will be understood that reversal of polarities on control lines 26, 27 will reverse the polarity of conduction of current through load 18 and that an alternating current comprising a series of periodically reversed half-wave pulses will pass to load 18 through switch 20.

from bus lines 12 and 13 are fed to the pulse generator 31. Reference is made to FIG. 6 to explain the relationship of waveforms related to operation of the converter for a resistive load 18 without a storage element 14. FIG. 6*a* shows the input frequency voltage on line 12 with respect to line 11. (The horizontal axes represent time and the vertical axes represent voltage in FIG. 6). The voltage across load 18 on bus line 13 with respect to bus line 11 is shown in FIG. 6*b* with a resistive load and no storage element 14. This assumes that controlled rectifier 22 is fired initially. FIG. 6*b* comprises the half-wave pulse reversal described above. The slight notches on the leading edge of the first pulse after reversal of polarity are primarily attributable to the time delay of the controlled rectifiers 21 and 22. FIG. 6*c* illustrates the potential on line 12 with respect to line 13 and represents the difference between the waveforms of FIGS. 6*a* and 6*b*. In other words, the voltage in FIG. 6*c* represents the open circuit potential across polarity switch 20. FIG. 6*d* illustrates the potential from bus line 13 with respect to line 12 on top 100 and that on bus line 12 with respect to line 13 on the bottom 101 which is fed to the separate inputs of the converter 30. As explained above, ground 29 will be at zero voltage so that all pulses in FIG. 6*d* are positive with respect to ground. The pulse generator 31 receives the two trains of half-wave pulses and clips them to form a square wave input, FIG. 6*e*, to a pulse forming circuit which produces a sharp initial or start-up pulse 102 on turning the system on and then produces a sharp pulse FIG. 6*f* in synchronism with each positive going leading edge of the square wave FIG. 6*e*. FIG. 6*e* would have, in fact, a single time baseline as the pulses of FIG. 6*d* are fed to a common clipper in generator 31. However, the square waves are shown in separate time baselines to facilitate correlation thereof with FIGS. 6*c* and 6*d*. All pulses fed from lines 12 and 13 to the pulse generator 31 are positive with respect to ground line 29 as explained above.

The pulses of FIG. 6*f* are fed by line 36 to the synchronized bistable multivibrator 32 to cause it to fire. Upon firing, a negative potential 103 in FIG. 6*g* is presented by line 37, to the input of a timing circuit 33. When the relatively negative potential is applied on line 37 a sawtooth wave is produced by the timing circuit FIG. 6*h*. At a predetermined potential of the sawtooth wave, the timing circuit terminates the sawtooth wave as at 104 and simultaneously produces a pulse 105 (FIG. 6*i*) which resets the synchronized multivibrator through line 38, thereby causing the potential on line 37 to become positive potential 106, FIG. 6*g*, and setting the multivibrator to be fired upon reception of another input pulse on line 36.

When the synchronized multivibrator 32 is fired, simultaneously with the negative swing 107 of potential on line 37 a positive pulse 108, FIG. 6*j*, is emitted on line 39 which will fire bistable multivibrator 34 producing an output reversal 109 on line 40, as shown in FIG. 6*k*, and 110 on line 41 as shown in FIG. 6*m*. The square waves of FIGS. 6*k* and 6*m* will be coupled by push-pull switching circuit 35 to supply them to the control lines 26 and 27 to control bias on control rectifiers 22 and 21 respectively. Hence, shortly after the end of the first sawtooth wave at time 111 of FIG. 6*h*, control electrode potential 112 of rectifier 22 will drop to a negative bias and control electrode potential 113 of controlled rectifier 21 will rise to positive bias, so that current will flow from bus line 13 to bus line 12 and bus line 13 will be clamped at ground potential, on line 29, whereas bus line 12 will swing positive during the half-waves that rectifier 21 does not conduct, i.e., when bus line 12 is positive with respect to ground line 29. Thus the positive half-waves 101 of FIG. 6*c* will be supplied to converter 30 from bus line 12.

The combination of the bistable multivibrator 32 and the timing circuit 33 permit adaptive frequency control. The multivibrator 32 may receive any number of pulses from line 36, while the timing circuit 33 is operating but the multivibrator 32 will not be affected thereby. That is important because the input on line 37 is not affected by the input pulses on line 36, during timing and the operation time of the timing circuit will be independent of the number, or frequency of input pulses. Hence, this circuit can provide an output on line 39 which is the result of adaptive frequency division of say equally spaced pulses introduced on line 36. That is to say that the output frequency on line 37 is a submultiple of an input frequency on line 36 obtained by division by an an integral number, and the output pulse obtained is synchronized with one of the input pulses. In another aspect, the combination comprises a monostable system operating for a precisely controllable time following triggering, in its unstable state, i.e., output on line 37. Following such time delay the system shifts to its stable state. When in the stable state it can immediately be shifted to its unstable timing state.

*Obtaining odd submultiples of input frequency*

Since only the nonconducted half-waves are introduced to the adaptive frequency converter, to synchronize firing of the bistable multivibrator 34, a pulse 115 which is conductible immediately upon reversal of control electrode potential will have commenced previously at 116 as may be seen in FIGS. 6*b* and 6*c* as a nonconducted pulse. Thus, there may be no hiatus such as that shown at 117 in FIG. 5*c* between positive and negative half-waves upon reversal of polarity of the polarity switch 20. As will be recalled, FIG. 5*c* illustrates operation of the circuit at an output frequency $f_{out}$, one-fourth the input frequency $f_{in}$, which is an *even* submultiple of input frequency. Hence, it will be obvious, reasoning by analogy or trial and error from this above discussion to those skilled in the art, that this circuit will not provide an $f_{out}$ which is an even submultiple of $f_{in}$. If the input of the converter 30 is connected across bus lines 11 and 12 as in FIG. 8 then *both odd* and *even* division of $f_{in}$ can be obtained, because the first positive pulse obtained subsequent to the end of the sawtooth wave in FIG. 6*h* will permit reversal of bistable multivibrator 34. Hence the circuit of FIGS. 1 and 2 provides the assurance that *only odd* submultiples of $f_{in}$ may be obtained, thereby providing a symmetrical waveform which contains fewer harmonics at the same time that the circuit will provide adaptive conversion of the frequency.

*Effect of storage element*

It should be remembered that FIG. 6 applies only to a simplified system in which the load 18 is an ideal resistor and the storage element 14 is disconnected from the circuit. When a capacitor 15 is employed as in FIG. 2, the waveform across the polarity switch 20 and supplied to the adaptive frequency converter will be changed. As is explained above with reference to FIGS. 5*f*, 5*g* and 5*h*, the waveform supplied to the converter 30 will approximate the difference between the solid line waveforms of load potential and the dotted line waveforms of the potential across the source 10. In other words, the potential across the polarity switch comprises the difference between the potentials across the load 18 and the source 10. As the waveform into the polarity switch will be advanced, in time comparing FIGS. 5*e* and 5*f*, so will the waveforms of FIGS. 6*b* to 6*m* because the points at which switching occurs will all be advanced to the degree that the input to the polarity switch is advanced. Hence, the output frequency obtained across the load will be the same as it would have been without the addition of the capacitor, but the total power delivered to the load will have been enhanced by the addition of the capacitor, which supplies power to the load during intervals when the polarity switch is not conducting.

*Adaptive frequency conversion*

The converter is adaptive in the sense that it will not permit reversal of the polarity switch 20 faster than the time required for the sawtooth wave of the timing circuit 33 to trigger, thereby providing an output pulse 105 on line 38 thereby setting the synchronized multivibrator to fire in substantial synchronism with the next pulse 100 or 101 which appears across switch 20. Hence, if the frequency of FIG. 6*a* were doubled, the frequency of FIG. 6*b* would probably be identical although, that would depend upon the phase relationship of the phase shift represented by the positive pulses 106 of FIG. 6*g* to the pulses of FIG. 6*f*. In other words, one input pulse 100 or 101 more or less after the end of the sawtooth wave could shift the output frequency slightly. Also, by altering the time constants of the timing circuit, the slope of the sawtooth wave, and hence the maximum permissible $f_{out}$ can be altered.

Figure 7:
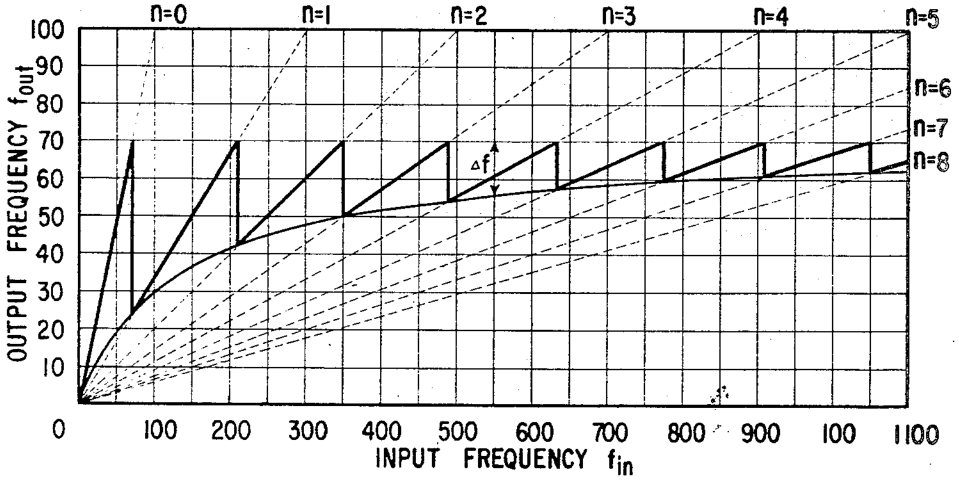
FIG. 7 illustrates operation of the systems and circuits shown in FIGS. 1 to 4.

Referring to FIG. 7, the output frequency of the adaptive frequency converter is shown for a maximum output frequency $f_{out}$ of 70 c.p.s. as a function of $n$ according to the formula which follows:

$$f_{out}=\frac{f_{in}}{1+2n}$$

$n=0, 1, 2, 3 \ldots \infty$.

A family of straight lines for $n=0$ to $n=8$ is shown. The solid line indicates the actual input to output frequency relationships obtained. At a value of $f_{out}$ of 70 c.p.s., the solid line becomes vertical and drops to the value of $f_{out}$ for the next higher value of $n$. This is so because the timing circuit, i.e., the sawtooth generator which has been adjusted to provide a sawtooth wave of approximately 7 milliseconds (approximately ½ wavelength of 70 c.p.s.) in length, will have set the synchronized multivibrator sufficiently late that say one non-conducted half-wave pulse which would fire the converter at an $f_{in}$ of 300 c.p.s. would not do so at an $f_{in}$ of 400 c.p.s.

The adaptive frequency converter is assumed to have been adjusted to limit the output frequency to an upper limit of 70 c.p.s., although any limit may be selected. A close study of the graph will show that for an input frequency from 50 to 70 c.p.s., $n=0$ $$\left(f_{out}=\frac{f_{in}}{1}\right)$$

giving an output frequency from 50 to 70 c.p.s. At 70 c.p.s. output frequency, the adaptive frequency converter changes to operation along the line $n=1$ giving 23 c.p.s.

$$\left(\frac{f_{out}}{3}=f_{in}=\frac{70}{3}\right)$$

As the input frequency is increased, the output frequency changes from 23 c.p.s. to 70 c.p.s. along the $n=1$ line. When a 70 c.p.s. output frequency is reached again, the input frequency is 210 c.p.s. Above that input frequency, the adaptive frequency converter will change to operation with the value of $n$ equal to 2

$$\left(f_{out}=\frac{f_{in}}{5}\right)$$

yielding (210/5) 42 c.p.s. output frequency. This procedure continues as the input frequency is increased throughout the graph. The output frequency variation $\Delta f$ for any given value of $n$ decreases as the value of $n$ employed increases (or as the input frequency increases). The 70 c.p.s. ordinate is the upper limit of $\Delta f$ and the locus of the lowest points of operation on the lines designated by values of $n$ at which the changeover occurs, define the lower limits of $\Delta f$. Notice that as $f_{in}$ approaches infinity, $\Delta f$ approaches zero and $f_{out}$ approaches 70 c.p.s. Thus, the output frequency variation can be predicted for any input frequency range.

For example, referring to FIGS. 6*a* and *b* it is clear that $f_{out}/f_{in}=⅕$ or $n=2$. Referring to FIG. 7, selecting any point on the solid portion of the $n=2$ line such as $f_{out}=60$ c.p.s. and $f_{in}=300$ c.p.s., we may proceed to analyze the time relationships involved.

At 300 c.p.s., the duration of one cycle is 3.33 ms. (milliseconds). At 60 c.p.s. the duration of one cycle is 16.6 ms. Referring to FIG. 6*k*, one half-wave length would have a duration of 8.8 ms. and the sawtooth wave of FIG. 6*f*, as shown, would have a duration to point 119 of about 20% less than 8.8 ms. or say 7.1 ms. Hence, if in FIG. 6*f* the fourth pulse from the left 120 occurred more than 1.7 ms. earlier, thereby preceding point 119 in time, the timing circuit 33 would not have fired yet to produce pulses 105 and 106. Hence synchronized multivibrator 32 would not be set for firing at the time of occurrence of such an earlier pulse 120, and another non-conducted half-wave 100 or 101 would pass into the pulse generator 31 before the converter 30 could reverse its output.

In other words, assume that the duration of the sawtooth wave remains 7.1 ms. Also assume that the frequency $f_{in}$ is raised to 360 c.p.s. The duration of one half cycle at this frequency would be 1.38 ms. In 7.10 ms., then, 5 complete half cycles taking 6.9 ms. will have occurred at $f_{in}$ and 0.20 ms. of a sixth half cycle will have elapsed.

$$\frac{7.10\text{ ms.}}{1.38\text{ ms.}}=5+\frac{0.20\text{ ms.}}{1.38\text{ ms.}}$$

Referring to FIGS. 6*a, b, e,* and *f*, it may be seen that at the end of the first three pulses of FIG. 6*b* that 5 half cycles of $f_{in}$ in FIG. 6*a* have occurred. Hence, the positive pulse 121 at the end of the first upper square wave in FIG. 5*e* will occur at the end of five half cycles. Hence, the fourth positive pulse 120 in FIG. 6*f* would precede the end 119 of the saw-tooth in FIG. 6*h*, by 0.20 ms. Another cycle or 2 (1.38 ms.) 2.76 ms. after the fourth pulse another negative half cycle would appear on FIG. 6*c* and that would occur 2.76 ms. less 0.20 ms. or 2.56 ms. later than the pulse 105 on line 38. Hence, the duration of the half-wave of FIG. 6*k*, would comprise seven half-waves of about 1.38 ms. duration, or 9.66 ms. One cycle of the wave of FIG. 6*j* would require about 19.32 ms., to provide an $f_{out}$ of $$\left(f=\frac{1}{t}\right)\frac{1}{0.01932}$$

or about 51.5 c.p.s. By experimentation, we have verified the above analysis and have shown that the relationship shown in FIG. 7 is representative of the operation of the adaptive frequency converter.

As a practical result then, a motor operable at or near 60 c.p.s. can be driven by a multitude of input frequencies with the setting of the timing circuit employed in FIG. 7 and whenever the duration of $1+2n$ half cycles of input frequency exceeds the duration of the sawtooth wave, $n$ must be decreased and whenever the duration of $1+2n$ half cycles is less than the duration of the sawtooth wave, $n$ must be increased.

*Adaptive frequency control circuit (AFCC)*

Figure 4:
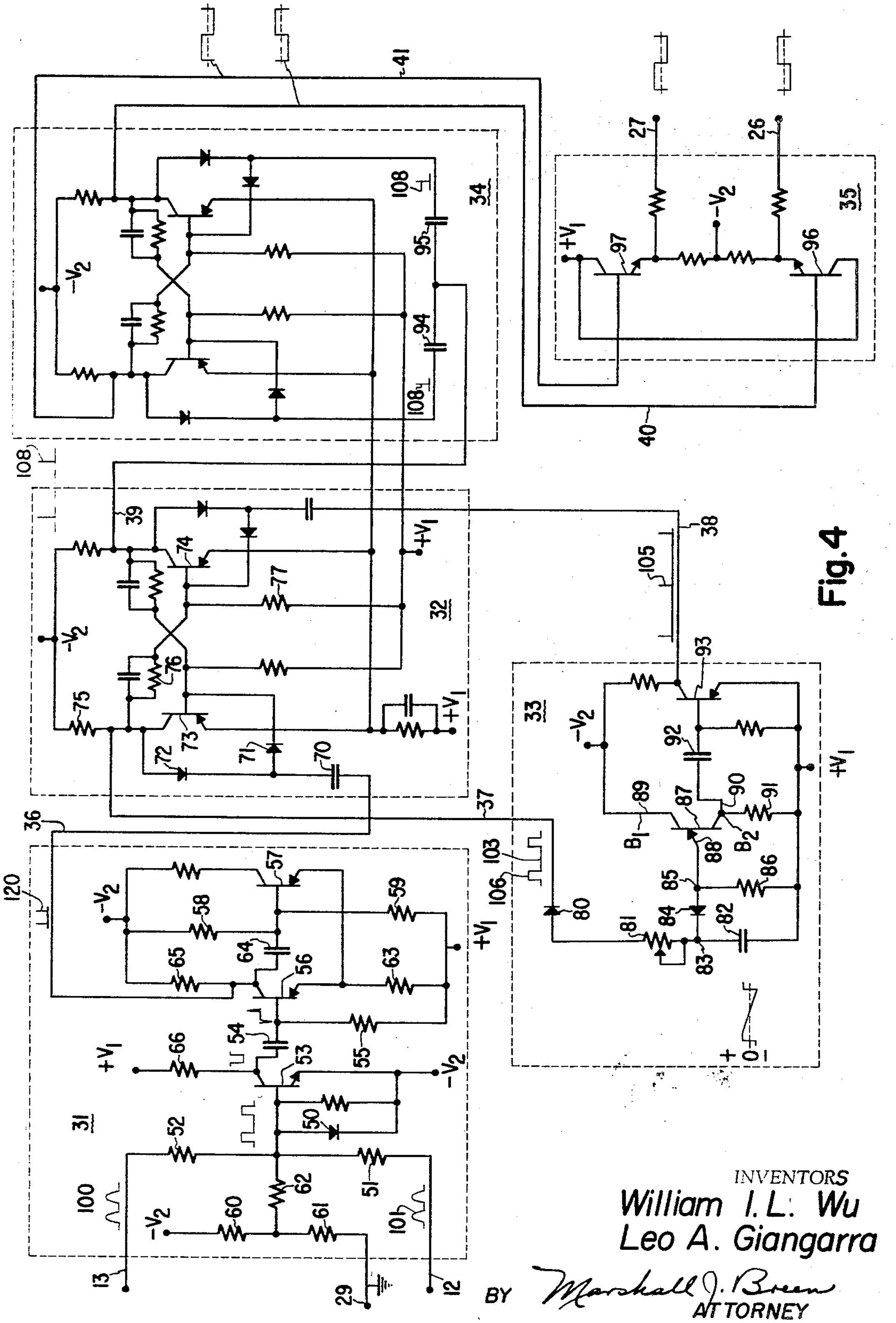
FIG. 4 is a schematic circuit diagram of the adaptive frequency control system shown in FIG. 3.

The AFCC is shown in schematic form in FIG. 4. Basically, the relationship of the units on the diagram is the same as in FIG. 3. As will be understood by those skilled in the art, the system of FIG. 3 may include circuits different from those specifically shown in FIG. 4.

The input connections to pulse generator 31 are bus lines 12 and 13 which are connected by high impedance isolating resistors 51 and 52 to clipper diode 50. The purpose of diode 50 is to clip as in FIG. 6*e* the half-waves, FIG. 6*d*, supplied from the bus lines 12 and 13 and to prevent saturation of transistor 53. The diode 50 has a nonlinear characteristic with a relatively high impedance for low input potentials such as that provided by source $-V_2$ and resistors 60, 61 and 62 which maintain the anode of the diode slightly positive with respect to its cathode in the quiescent condition, so that the base-emitter junction of NPN transistor 53 will be slightly forward biased. Then, when a large potential is received from bus line 12 or 13 at the anode of diode 50, it will raise the base-emitter potential to the maximum potential permitted by the low impedance of diode 50 in series with the high impedance of resistors 51 and 52. In a unit we have operated successfully a silicon diode 50 having a voltage drop of about 0.6 volt for a 115 volt input to bus lines 12 and 13 and resistors 51 and 52 of 100K ohms was employed successfully to clip positive half-wave pulses.

A positive clipped pulse received on the base of NPN transistor 53 which has a positive bias from $+V_1$ through collector resistor 66 on its collector and a negative bias of $-V_2$ on its emitter is amplified and inverted. The capacitor 54 and resistor 55 between the collector and $+V_1$ bias serve as a capacitive differentiator circuit providing a negative pulse and a positive pulse at the junction between them in response to each clipped half-wave. These pulses are impressed on the base of PNP transistor 56, which is a portion of the Schmitt trigger circuit type of common emitter resistor multivibrator, including PNP transistor 57. Transistor 56 is cut off and PNP transistor 57 conducts in the quiescent condition (no input to the base of transistor 56). In the quiescent condition, the collector voltage of transistor 56 is at the negative bias of $-V_2$. A forward base-emitter bias on transistor 57 is maintained on the base of the transistor by means of voltage dividing resistors 58 and 59 both connected to the base and respectively connected to $-V_2$ and $+V_1$. Emitter resistor 63 connected from $+V_1$ to the emitters of both transistors 56 and 57 provides a low voltage drop in response to emitter current in order to maintain forward bias on the base-emitter junction of transistor 57 while reverse biasing the base-emitter junction of transistor 56. The base of transistor 56 is held at positive bias $+V_1$, in the quiescent condition, by connection thereto through resistor 55.

A negative pulse on the base of transistor 56 forward biases its base-emitter junction and collector current will flow through collector-resistor 65 thereby raising collector potential to slightly below emitter potential. Since emitter-resistor 63 is selected to be small and collector resistor 65 is large, the collector will rise to a potential near $+V_1$. The positive swing of that collector will be coupled through capacitor 64 to drive the base of transistor 57 sufficiently positive to cut off that transistor by reversing the base-emitter bias. As soon as the sharp negative pulse on the base of transistor 56 ends, the base will return to positive potential and the potential on the emitter will be more negative than previously, thereby tending to reduce current through the collector of transistor 56. At the same time, the base of transistor 57 will become more negative after the leading edge of the pulse through capacitor 64 has passed, so that emitter current from transistor 57 will flow through resistor 63 thereby quickly driving the two emitters negative and cutting off transistor 56. A sharp positive pulse will appear on line 36 from the collector of transistor 56, during that time, as shown at 120, in FIG. 6*f*.

*Synchronized multivibrator*

The positive pulses on line 36, FIG. 6*f*, are fed to the synchronized multivibrator 32. They are introduced through coupling capacitor 70 to the anode of diode 71 and the cathode of diode 72. The cathode of diode 71 is connected to the base of PNP transistor 73 and the anode of diode 72 is connected to the collector of transistor 73. At this time transistor 73 will be conducting occasionally as at voltage 106 in FIG. 6*g*, and if so the positive pulse 120, FIG. 6*f* will reverse bias the base-emitter circuit by impressing positive potential on the base through diode 71. The collector which is near emitter potential when conducting would permit conduction through diodes 72 and 71 to the base which is maintained nearer negative bias $-V_2$ by biasing resistors, as shown. Hence, the positive pulse on the cathode of diode 72 will cut off diode 72, thereby creating a further reduction in collector current and speeding up cut off of transistor 73. PNP transistor 74 comprises the other element of bistable multivibrator 32 and it will be turned on by the capacitively coupled negative pulse on the collector of transistor 73 as is well known in the art.

Hence a negative potential near the negative bias $-V_2$ on the collector of transistor 73 will appear on line 37 connected thereto, as resistor 75 from $-V_2$ to the collector is small in comparison with resistor 76 connected from the collector to the base of transistor 74 and to positive bias $+V_1$ through small resistor 77. The negative potential on line 37 will obtain so long as transistor 73 is cut off. This waveform may be seen by reference to FIG. 6*g*, and particularly potential 103.

*Timing circuit*

The timing circuit 33 is connected to line 37 at the cathode of a diode 80. An RC circuit comprising a rheostat 81, and a capacitor 82 in series is connected between the anode of diode 80 and positive bias $+V_1$. Capacitor 82 charges in the negative direction during the presence of negative potential on line 37. The waveform of the potential at the junction 83 between rheostat 81 and capacitor 82 is shown in FIG. 6*h*. The sawtooth wave is a descending one.

The cathode of a diode 84 is coupled to junction 83. Its anode is coupled through a junction 85 to resistor 86 which is connected at its opposite end to positive bias $+V_1$. The emitter 88 of a unijunction transistor 87 is connected to junction 85. Its first base, $B_1$, 89 is connected to negative bias $-V_2$ whereas the second base, $B_2$, 90 is connected through a resistor 91 to positive bias $+V_1$. As will be well understood by those skilled in the art the equivalent resistance $RB_1$ between $B_1$, the first base, 89 and the emitter is variable and inversely proportional to the potential difference therebetween with a valley potential between the emitter and $B_1$ at which the impedance becomes very large. This is partially explained in Electronics, p. 58, vol. 35, No. 21, May 25, 1962. If emitter potential with respect to base $B_1$, 89, is reduced below the valley potential, then $RB_1$ becomes very large and the current through the emitter 88 and base $B_1$, 89 becomes negligible. Similarly, the current through the second base, $B_2$, 90 becomes negligible. The emitter to base $B_2$ resistance $RB_2$ is relatively constant. When emitter to base $B_1$ potential rises, the resistance $RB_1$ remains high until a peak potential is reached, at which emitter current rises sharply with a concomitant reduction in potential between the emitter 86 and base $B_1$, 89. Capacitor 92 sharpens $B_2$ pulses to transistor 93.

In the quiescent condition, before negative potential appeared on line 37, the potential thereon point 106, FIG. 6*g*, will have been near positive bias $+V_1$ because the collector of transistor 73 was conducting. Hence capacitor 82 will have been at a potential greater than or equal to the potential on junction 85, neglecting any drop across diode 84. This potential will be determined by the voltage drop across resistor 86 as the result of current flow into emitter 88 and diode 84. If capacitor 82 is charged sufficiently to cut off current through diode 84, a stable condition of current flow into emitter 88 through $RB_1$ will obtain with concomitant current flow through $RB_2$ from base, $B_2$, 90 and resistor 91 so that base 90 will be near negative bias of $-V_2$, as resistor 91 is selected to be large compared to $RB_1$ plus $RB_2$ in the quiescent condition.

When capacitor 82 becomes negatively charged by a negative potential, during generation of the sawtooth wave thereby sufficient to forward bias diode 84, near point 119, FIG. 6*h*, a current will flow through resistor 86 (and diode 84) thereby increasing the negative potential on junction 85. If the value of resistance 86 and the unijunction transistor 87 are properly matched and selected, the unijunction transistor emitter 88 to base $B_1$, 89 potential will drop below the valley point potential. Hence, current through the emitter, $B_1$ and $B_2$, will cease, substantially and the potential of base $B_2$, 90 will rise to positive bias $+V_1$. The capacitor 82 will charge quickly through resistor 86 and diode 84 until emitter 88 is raised to the peak potential, at which time the resistance of $RB_1$ will be reduced, emitter current will flow, potential on junction 85 will drop, reverse biasing diode 84 and base 90 will return to quiescent, more negative potential.

Simultaneously, with the positive pulse on base 90 due to reaching valley potential at emitter 88, the positive pulse 105, FIG. 6*i*, will have been amplified by amplifier 93 and supplied to line 38 to turn off transistor 74, and turn on transistor 73 in like manner to the operation of the positive pulse on line 36. Such operation will be obvious to those skilled in the art of semiconductor multivibrator circuitry. Hence, almost immediately, a positive potential 106, FIG. 6*g*, will appear upon line 37 as transistor 73 is turned on. Thus, the diode 80 will be reverse biased and the rate of discharge of capacitor 82 will not depend upon rheostat 81, diode 80, or line 37 except for the period of time required for transistor 73 and multivibrator 32 to operate.

*Synchronized multivibrator output*

When transistor 74 is turned on in response to a positive pulse 120, FIG. 6*f*, on line 36, the collector of transistor 74 becomes positive and a positive potential 108 appears on line 39 connected to the collector of transistor 74.

*Bistable multivibrator*

The bistable multivibrator 34 is connected to line 39 through capacitors 94, 95 which cause the pulse sharpened thereby as 108, FIG. 6*j*, to actuate the bistable multivibrator 34. The circuit is substantially identical to that for the synchronized multivibrator 32. Hence, the operation of the circuit as shown in FIG. 4 will be obvious to those skilled in the art. The output on line 40 and line 41 are square waves, FIGS. 6*n* and 6*m*, 180° out of phase, but phase synchronized with the input signal, FIG. 6*a* and the half-wave signal FIG. 6*b*, with a negligible time delay for operation of the adaptive frequency control circuit.

*Push-pull switching circuit*

The push-pull amplifier 35 is employed to provide a high impedance load for the bistable multivibrator, and the NPN transistors 96 and 97 are connected as common collector or emitter follower switching circuits with the output taken on lines 26 and 27 respectively from the emitters of the transistors. The phase and waveform of the output signal on lines 26, 27 will thus be similar to those on lines 40, 41 respectively, in FIGS. 6*k* and *m*. The system of this invention may be employed to provide three phase AC to AC frequency conversion from a three phase source. Furthermore, this invention can be employed to provide multiple phase power transfer from a single phase source, as by providing three phase 60 c.p.s. power from a 360 c.p.s. power supply. In such a case, three adaptive frequency control circuits can be employed to control three independent polarity switches, but, the time-phase relationships of the three converters would be coordinated by logic circuitry in order to provide the desired time delay between phases.

What is claimed is:

1. A wave converter comprising an input circuit adapted to receive an input signal comprising a train of pulses, first bistable means having a first input circuit for receiving said pulses from said input circuit and said bistable means having a first condition and a second condition of operation, said first bistable means having a second input circuit, and a first output circuit providing a first signal of constant magnitude in said first condition and a second signal of constant magnitude in said second condition, a time constant circuit having input and output terminals, said input terminals being connected to said first output circuit, said time constant circuit providing at said output terminals a control signal in response to said second signal after a predetermined time delay, a switching circuit connected to said output circuit of said time constant circuit to provide a reset signal to said second input circuit of said first bistable means in response to a said control signal, said first bistable means having a second output circuit providing a transfer signal upon transition from said first condition to said second condition, a second bistable means having a third input circuit and a third output circuit, said second output circuit of said first bistable means being connected to said third input circuit of said second bistable means, whereby, the output of said third output circuit of said second bistable means changes substantially in synchronism with occurrence of a said transfer signal, said transfer signal occurring after a time delay predetermined by said time constant circuit, and substantially in synchronism with one of a train of pulses received by said input circuit of said wave converter.

2. A wave conversion system comprising two input terminals for connection to a source of alternating current, a polarity switch having a pair of polarity reversible power terminals and a pair of control terminals, said power terminals being conductive in one direction for inputs to said control terminals of one set of polarities, said power terminals being conductive in the reverse direction for inputs to said control terminals of a reverse set of polarities, means for storage of electrical charge having two ends, one of said input terminals being connected to one end of said means for storage, the other of said input terminals being connected to one of said power terminals, the other end of said means for storage being connected to the other one of said power terminals, a pair of output terminals, connected respectively to the ends of said means for storage, a wave converter for providing control signals to said control terminals of said polarity switch for reversing the polarity of conduction between said power terminals, said wave converter having a pulse input circuit coupled across said power terminals, said wave converter having a control output circuit with connections to said control terminals of said polarity switch, said wave converter providing said control signals in response to input pulses presented thereto, said control signals being phase synchronized with the potential applied to said pulse input circuit across said power terminals and providing reversal of said control signals at a frequency determined by division of said high frequency with an odd integer which may be selected by adjustment of said wave converter, said wave converter including first bistable means having a first input circuit for receiving pulses from said pulse input circuit, said first bistable means having a primary condition and a secondary condition of operation, said first bistable means having a second input circuit, and a first output circuit providing a first signal of constant magnitude in said first condition and a second signal of constant magnitude in said second condition, a pulse generating timing means having timing input and timing output terminals, said timing input terminals being connected to said first output circuit, said pulse generating timing means providing at said timing output terminals a timing signal in response to said second signal after a predetermined time delay, a switching circuit connected to said timing output circuit of said pulse generating timing means to provide a reset signal to said second input circuit of said first bistable means in response to a said timing signal, said first bistable means having a second output circuit providing a transfer signal upon transition from said first condition to said second condition, a second bistable means having a third input circuit and a third output circuit, said second output circuit of said first bistable means being connected to said third input circuit of said second bistable means, whereby, the output of said third output circuit of said second bistable means changes substantially in synchronism with occurrence of a said transfer signal, said transfer signal occurring after a time delay predetermined by said pulse generating timing means, and substantially in synchronism with one of a train of pulses received by said pulse input circuit of said signal generator, said pulse generating timing means comprising a triggered delayed pulse generator including said pair of timing input terminals, a capacitor having one end thereof connected to one of said timing input terminals, the other end thereof being connected in series through the series combination of a first rectifier and a resistor to the other of said timing input terminals, said first rectifier being oriented to conduct from said other end of said capacitor towards the other of said timing input terminals, a second rectifier having its cathode connected to said other end of said capacitor, the anode of said second rectifier being connected to the control electrode of a bistable device having two states of conduction and to a resistor connected to said one input terminal, said bistable device having an output circuit connected to said timing output terminals whereby a change in output is produced on said timing output terminals a predetermined period of time after a negative potential is applied to said other timing input terminal with respect to said one timing input terminal.

References Cited

UNITED STATES PATENTS

| | | | |
|---|---|---|---|
| 2,949,547 | 8/1960 | Zimmermann | 307—88.5 |
| 2,767,313 | 10/1956 | Martinelli | 328—15 X |
| 3,202,884 | 8/1965 | Bullock | 307—88.5 |
| 3,252,077 | 5/1966 | Schonholzer et al. | 323—22 |
| 3,148,323 | 9/1964 | Blake et al. | 321—69 X |
| 3,178,630 | 4/1965 | Jessee | 321—7 |
| 3,256,244 | 9/1966 | Byloff et al. | 321—61 |

LEE T. HIX, *Primary Examiner.*

G. GOLDBERG, *Assistant Examiner.*

UNITED STATES PATENT OFFICE
CERTIFICATE OF CORRECTION

Patent No. 3,398,372 August 20, 1968

William I. L. Wu et al.

It is certified that error appears in the above identified patent and that said Letters Patent are hereby corrected as shown below:

Column 3, line 15, beginning with the italicized heading "Adaptive frequency converter", cancel all to and including "The signals" in line 17, same column 3, and insert the same between lines 67 and 68 of Column 6.

Signed and sealed this 3rd day of February 1970.

(SEAL)
Attest:

Edward M. Fletcher, Jr.
Attesting Officer

WILLIAM E. SCHUYLER, JR.
Commissioner of Patents